US010178230B1

(12) United States Patent
Seay

(10) Patent No.: US 10,178,230 B1
(45) Date of Patent: Jan. 8, 2019

(54) METHODS AND SYSTEMS FOR COMMUNICATING SUPPLEMENTAL DATA TO A CALLEE VIA DATA ASSOCIATION WITH A SOFTWARE-AS-A-SERVICE APPLICATION

(71) Applicant: Gordon E. Seay, San Diego, CA (US)

(72) Inventor: Gordon E. Seay, San Diego, CA (US)

( * ) Notice: Subject to any disclaimer, the term of this patent is extended or adjusted under 35 U.S.C. 154(b) by 0 days.

(21) Appl. No.: 15/862,628

(22) Filed: Jan. 4, 2018

(51) Int. Cl.
*H04M 3/00* (2006.01)
*H04M 3/42* (2006.01)
*H04L 29/06* (2006.01)
*H04W 4/14* (2009.01)

(52) U.S. Cl.
CPC ..... *H04M 3/42382* (2013.01); *H04L 65/1006* (2013.01); *H04L 65/1013* (2013.01); *H04L 65/1096* (2013.01); *H04W 4/14* (2013.01)

(58) Field of Classification Search
CPC .......... H04M 3/42382; H04L 65/1006; H04L 65/1013; H04L 65/1096; H04W 4/14
See application file for complete search history.

(56) References Cited

U.S. PATENT DOCUMENTS

| 9,134,882 | B2* | 9/2015 | Nuggehalli | ........ H04N 1/00244 |
| 2015/0341499 | A1* | 11/2015 | Korsei | .............. G06F 17/30882 |
| | | | | 715/205 |
| 2017/0331935 | A1* | 11/2017 | Bettesworth | .......... H04M 1/663 |

\* cited by examiner

*Primary Examiner* — Khai M Nguyen

(57) ABSTRACT

Disclosed are methods and systems for communicating supplemental telephonic entity data to a callee via data association with a Software-as-a-Service application. An example method comprises providing a networked application server, the application server to access a data storage, providing a SaaS application, subscribing a subscriber organization to the SaaS application, receiving at the user interface of the SaaS application data corresponding to an entity, storing within the data storage a data record for the entity, providing a telephonic switching framework, receiving an incoming call with caller ID information, identifying the entity by caller ID information from the data storage, identifying supplemental data in the data storage associated with the entity, placing an outbound call, and communicating to a callee who is a member of the subscriber organization the supplemental data. Some examples of systems generally comprise a server, a SaaS application configured to receive user input and insert user input into a collection of entities within a data storage, a telephonic apparatus configured to receive incoming calls with caller ID, associate the caller ID information with supplemental data, place outgoing calls, effect text-to-speech synthesis, and audibly transmit to a callee data information from the data storage.

20 Claims, 7 Drawing Sheets

600 http://application.publisher.com — 605

CRM Application — 610

<u>Customers</u>　　Prospects

Customer　　620　　615　　621

First Name [John]　　Last Name [Smith]
— 622
Organization [Acme Widget Company]
— 623
Street [1234 Main Street]
— 625
City [Los Angeles] — 624　State [CA]
— 630
Phone 1 [(213) 051-9812]
— 631
Phone 2 [(213) 052-6481]
— 632
Email [john@domain.com]
— 640
Interests [wants plastic bins to hold widgets]

Orders　　7　　——— 641
Revenue　$1,234　——— 642
Latest
Support　#183458　——— 643
Ticket

690
[SUBMIT]

FIGURE 6

METHODS AND SYSTEMS FOR COMMUNICATING SUPPLEMENTAL DATA TO A CALLEE VIA DATA ASSOCIATION WITH A SOFTWARE-AS-A-SERVICE APPLICATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present disclosure relates generally to methods and systems for communicating supplemental telephonic entity data to a callee via data association with a Software-as-a-Service application.

Typical, current methods of identifying a caller to a callee during a telephone call disclose in a visual format the caller telephone number and, sometimes, the caller name. Although one may presume that both a caller telephone number and a caller name would be paired at all times, and presented together, the technical and financial hurdles for passing caller name information are far greater than for passing the caller telephone number.

When telephone companies transmit a call across the Public Switched Telephone Network (PSTN), originating telephone companies commonly transmit the caller telephone number. Originating telephone companies do not, however, transmit the caller name, referred to as the CNAM. Telephone companies which receive calls from originating telephone companies can make up for the deficient data by sourcing CNAM information from one or more CNAM database providers. Such providers routinely charge a fee per lookup, and the lookup request adds latency to the call connection process because the receiving telephone companies must quickly source the information on a per-lookup basis prior to passing along a call to their customer. Such sourced data is also not controlled by the recipient of a call, as will be further explained herein.

Cellular telephone companies have existing latency concerns when receiving a call from an originating telephone company, in that communicating between a tower and a cellular phone is already subject to delays. Adding a lookup delay to the process of forwarding a call is one argument against cellular companies performing this step. Paying for a lookup is another argument against doing. Such companies also have a greater variety of network and device compatibility concerns than historic landline telephone companies, due to encryption, digital network protocols, devices with varying degrees of displays, calls crossing networks during roaming, etc.—all of which are relevant when needing a framework for the transmission and display of a caller name. And, there is no regulatory body requiring cellular telephone companies to provide CNAM information to its customers.

As a result of technical hurdles, financial costs, latency concerns, and the lack of a governing body requiring transmission of CNAM data, cellular telephone companies typically don't source and transmit CNAM data to their customers' devices.

There exists a current foundational problem in that a recipient of a call has no control over the CNAM data they receive and the data they might prefer to see (e.g. an unabbreviated name or a caller's married name) is not that which is provided. Even if a caller name is presented on a device, such as in the case of calls to landline or some Voice-Over-IP (VOIP) devices, the registered name in the CNAM database sourced by the callee's telephone company may be different than the familiar name by which the callee knows the person or business entity which is calling them. For example, a caller may have one's maiden name in a CNAM database when a callee knows the caller by their married name. Or, a company name may be abbreviated or converted to an unrecognizable acronym in a CNAM data field which often carries a maximum length of just 15 characters. Thus, even when a callee sees a caller name presented with an incoming call, the name may not be recognizable despite having familiarity with the entity.

Meanwhile, people or organizations today often create their own databases of contacts. Businesses, for example, maintain databases of their company's prospects and customers. These databases routinely contain telephone numbers for people or organizations, with an association between the telephone numbers and the person or organization names. Additional data is also commonly present in such databases, including but not limited to, "also known as" (AKA) names for a person or organization, addresses, contact history, order history, images and other descriptive information about the entity.

The creation of those databases of entity information often occurs within modern software delivery systems, including Software-As-A-Service ("SaaS") platforms, whereby the application and the client are connected by a wide-area-network ("WAN"). Thousands or millions of distinct users of these hosted SaaS applications may connect to a SaaS platform and application.

When users of a SaaS application which manages business contacts receive a telephone call, some common current methods of identifying a caller involve a human manually asking a caller for their name or account number and searching for the computer record corresponding to the caller or seeing a caller ID phone number and searching for the applicable computer record. These methods take valuable time and provide a poor experience for the caller.

The problem of unknown caller name information is frustratingly magnified in business environments where SaaS applications are used to manage contacts. By the very nature of the fact that a relationship exists or may come to exist between two people or organizations that caused a user of a SaaS application to input data about the other entity, the likelihood of telephone contact between them is quite high. But, at the time of receiving a subsequent call from any such entity whose caller name and other information also exists within the data storage of a SaaS application, such stored data cannot be readily provided to callees using many landline or cellular telephones at the time of the call notification using current methods and systems.

Knowledge of differential, supplementary data could affect whether a callee wishes to accept or reject a call, and if such data is presented with the incoming call notification, there is limited time for a callee to make the decision to accept or reject the call. Knowledge of name information and other supplemental data could also affect the handling of a call after acceptance thereof (i.e. answering the call) and greatly improve the customer experience.

It is inefficient, tedious, and often impossible in a necessary period of time prior to, or even shortly after, accepting an incoming call for a user of a SaaS application to manually search for a caller ID phone number, wait for a user interface screen to load data, determine which of potentially-multiple search results is the desired record, select and view the desired record to identify the possibly-familiar entity, and read pertinent information about the entity.

Even if caller name information were presented to a callee via traditional CNAM data, which again is not controlled by the recipient of the call, and even if the CNAM could be recognized from the maximum 15 characters, there also exists the possibility that current visual methodologies are insufficient. Beyond addressing users who have visual impairments, callees who are driving or otherwise preoccupied may prefer an audible solution to identifying a caller's name. In fact, while driving, it may be unlawful to read the display of a phone but it is lawful to click the answer button on the steering wheel of a vehicle which maintains a synchronized connection to the telephone. Strangely, current methods presume that callees will be able to accept visual information but the general purpose of telephonic conversation is to exchange audible information so the presumption of a callee being available for visual communication may not also be accurate. Furthermore, audible communication of caller name information could assist callees with name pronunciation when first speaking to the caller.

Beyond the problems associated with missing or delayed caller name data, callees also experienced reduced efficiency, performance and service effects from not knowing other pertinent information about a caller which may be present in a SaaS application. However, such callee-owned, private information is not known by or transmitted by telephone companies, and modern integration methodologies and systems don't supply such data to traditional telephone devices.

Thus, there exists a need for methods or systems which, in a timely manner, communicate, often in an audible manner, differential or supplemental data to a callee via data association with a SaaS application. There exists a need for methods and systems which allow a callee to accept or reject a call based upon additional data presented quickly with the aid of computerization. There exists a need for methods and system which allow a callee to improve a call experience based upon supplementary data provided from a SaaS application. There exists a need for methods and systems which allow a callee's organization to input and control the data they receive to identify a caller, which is markedly different than what occurs when receiving standard caller ID information. Examples of new and useful methods and systems relevant to the needs existing in the field are discussed below.

BRIEF SUMMARY

The present disclosure is directed to methods and systems for utilizing supplemental caller identification data, sourced from a SaaS application, during the routing of a telephone call. Some examples of methods include providing a networked application server, the application server to access a data storage, providing a SaaS application, subscribing a subscriber organization to the SaaS application, receiving at the user interface of the SaaS application data corresponding to an entity, storing within the data storage a data record for the entity, providing a telephonic switching framework, receiving an incoming call with caller ID information, identifying the entity by caller ID information from the data storage, identifying supplemental data in the data storage associated with the entity, placing an outbound call, and communicating to a callee who is a member of the subscriber organization the supplemental data.

Some examples of systems generally comprise a server, a SaaS application configured to receive user input and insert user input into a collection of entities within a data storage, a telephonic apparatus configured to receive incoming calls with caller ID, associate the caller ID information with supplemental data, place outgoing calls, effect text-to-speech synthesis, and audibly transmit to a callee data information from the data storage.

The invention permits entity data to be meaningfully exposed to users of SaaS applications at the time of receiving an incoming call in a manner not available with current methods and systems. The invention solves real-world problems including financial and latency effects associated with CNAM lookup (particularly on mobile phones), limited CNAM characters, unrecognized CNAM names, and not having internal organization database information in an audible or timely manner for the start of a call.

Quite notably, the invention also permits organizations to create and define the entity data they will later receive at the time of an incoming call.

BRIEF DESCRIPTION OF THE DRAWINGS

FIG. 6 is a screenshot of an example user interface produced by an application according to the methods and systems described herein.

DETAILED DESCRIPTION

Figure 1:
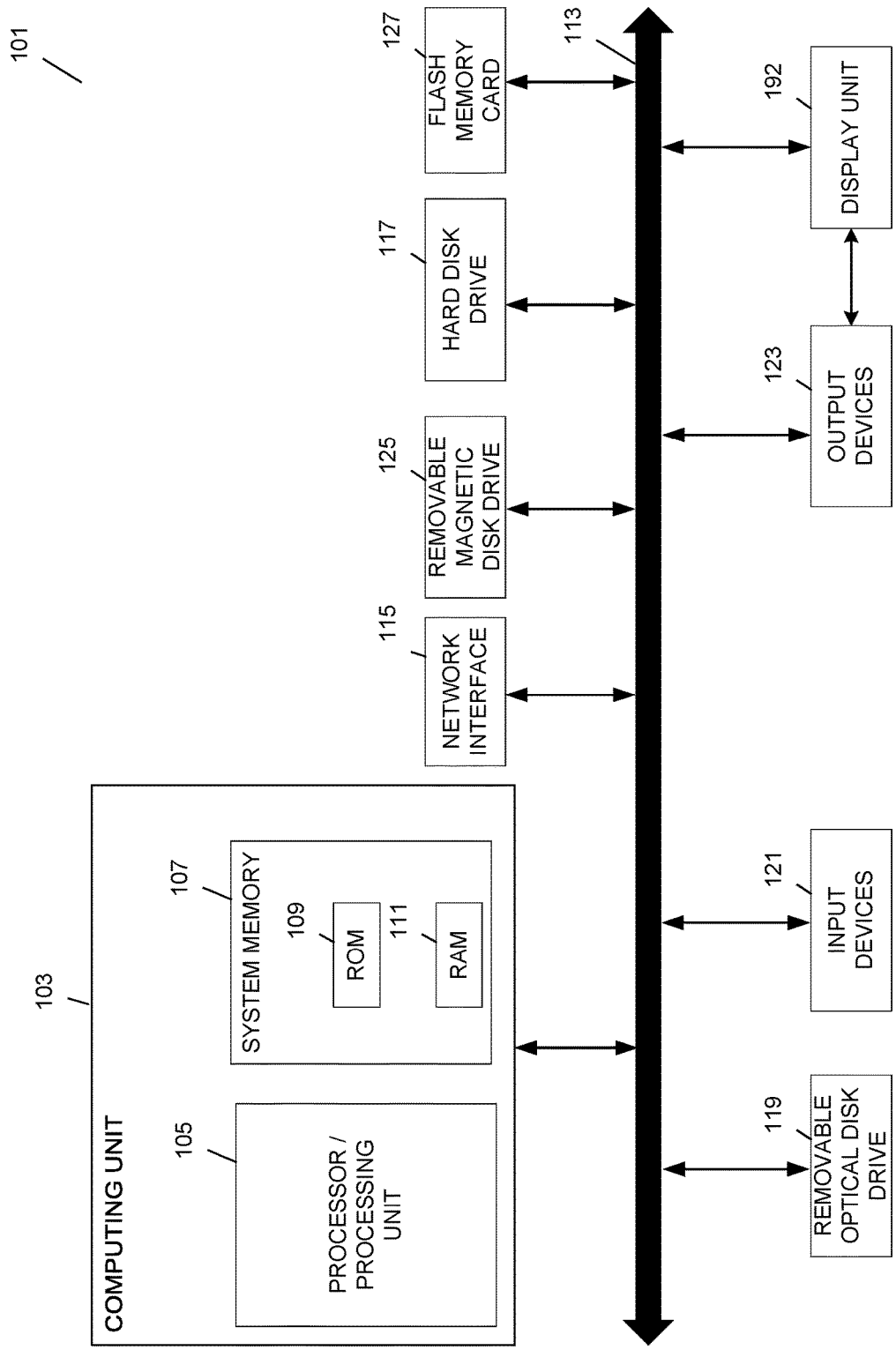
FIG. 1 shows a schematic view of an example of a programmable computing device.

The disclosed methods and systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems and methods are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Throughout the following detailed description, commas or periods or other symbols used in punctuation, when appearing within quoted text, may exist for grammatical purposes. A comma or period, for example, may be a meaningful part of the quoted text or it may only serve to add grammatical accuracy to the containing sentence. The reader should understand the difference based upon context.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

The following detailed description includes definitions of selected terms employed herein. The definitions include various examples and/or forms of components that fall within the scope of a term and that may be used to implement the disclosed methods. The examples are not intended to be limiting. Both singular and plural forms of terms may be within the definitions. The reader should further understand that definitions of some terms should be construed based upon context, so that industry-specific terms that also have generalized meaning in the English language shall be read with an industry-specific definition in their technical context and a general English definition outside of their intended technical context. For example, "field," per the technical definition hereafter, may refer to a unit of data in data structures, but "field" outside of data structure contexts may still be used in general English wordings herein to describe an area of open land or a field of study.

"Access a data storage," or like terminology, as used herein, includes accessing a data storage by direct or indirect means. Specifically, if a first application, or unit of code, is configured to access a data storage, it should still be deemed to access the data storage even if such is handled through a second software application, or second unit of code, with which the first application, or unit of code, communicates. For example, in client-server architectures, or mobile application architectures, an application may communicate with a data storage via communication to code operating on the server, whereby the server code communicates with the data storage and the client application or mobile application communicates with the server; in such a scenario, the application should still be deemed to have access to the data storage.

"Application," as used herein, includes but is not limited to a software program with a specific purpose. Applications may be web applications that include one or more of HTML layouts, scripts, compiled code, or other formats commonly used in hosted or client/server applications. Applications may be desktop applications. Applications may be software programs running on mobile devices. Applications may be known as "apps," such as, but not limited to, a communication app, a social media app, a messenger app or a task-specific business app, where the apps are downloaded from online stores operated typically by the publisher of an operating system, such as the Windows Store, or equivalent stores from Apple or Google or Amazon.com. Applications may be executed on clients, servers, or combinations thereof. Applications may be configured to access databases or other data references stored on servers, clients, or other network accessible computing devices. Applications may define hosted applications, hosted services, cloud computing applications, and/or additional or alternative technologies that provide software as a service (SaaS). An application may also be a hosted software program within a group of hosted applications included in a group of related applications defining a cloud software suite. The application code itself, in some but not necessarily all variations, may be stored on any type of non-transitory computer-readable storage medium or tangible computer storage device, such as hard drives, solid state memory, flash memory, optical disc, and/or the like.

"Application server," as used herein, includes but is not limited to a computing device including a processor and configured to at least partially run one or more software applications. An application server may be configured to exclusively run or deliver to a client computing device a single software application or multiple software applications. An application server may be configured to deliver, and not execute on its own processor, computing code associated with a software application to a client computer or client computing device. In such situations, the client computing device may partially or fully execute the application code and the application server may execute only a partial portion or no application code. An application server may be a software framework instead of a dedicated computing device, where the software framework serves to execute computing code and/or deliver computing code to a client computing device. An application server may be a web server configured to serve applications. An application server may be a delivery framework to allow download of software applications to mobile and desktop operating systems. In such instances, thereafter download, the application may not utilize or communicate with the delivery framework for purposes of using the application. Types of application servers or application server frameworks are numerous and include, but are not limited to, Java application servers, Microsoft application servers, PHP application servers, Amazon cloud servers and services, Microsoft Azure cloud servers and services, and custom-created application servers or application server frameworks. An application server may even be an online store operated typically by the publisher of an operating system, such as the Windows Store, or equivalent stores from Apple or Google or Amazon.com.

"Caller ID," as used herein includes but is not limited to a stream of digits referring to an incoming caller's telephone number, or in the case of a Session Initiated Protocol (SIP) originating phone, the unique alphanumeric equivalent corresponding to the caller's number or address on the network and in such instances the use of the accompanying word "digits" (i.e. "caller ID digits") or "information" (i.e. "caller ID information") will be understood to equally refer to alphanumeric data. "Caller ID" may also be equally construed, or vice-versa, as "ANI" (Automatic Number Identification) which is a fundamentally-equivalent term used more frequently amongst those within the telecommunications industry.

"Client computer," as used herein includes, but is not limited to, a computer or other electronic device configured to run software applications. A client computer may be a computing device with a processor partially or fully executing software instructions. For example, the client computer may be a desktop computer, a laptop computer, a mobile electronic device, such as a smartphone, a personal data assistant, or a tablet computer. The client computer may be any currently known or later developed computing device.

"CNAM," as used herein is an acronym referring to a Caller ID Name. The standard CNAM utilization employs 15 characters, however, for the purposes of this disclosure, the actual length could vary. CNAM data may be obtained from one or more sources.

"Collection," as used herein, includes but is not limited to, a database, a database table, a set of records within a table or database, a list of items or entities, an array of items or entities, computer-formed dictionaries or any other grouping of data records or common variations of data collections.

"Data storage," as used herein, refers to a physical and/or logical entity that can store data. Data storage may be, for example, a computer containing a database, or simply a database, a table, a file, a list, a queue, a heap, a memory, a register, a file directory, a storage location, and so on. Data storage may reside in one logical and/or physical entity and/or may be distributed between two or more logical and/or physical entities. Data storage may be any currently known or later developed means for storing data in a computing environment, including memory local to an application server or remote memory in communication with the application server. A data storage may also include a local or remote cache server or a cloud-based data repository.

"Entity," as used herein, includes but is not limited to, an organization, business, individual human contact of a business, person, customer, prospective customer, vendor, employee, contractor, associate, worker or any type of legal entity commonly a party to a business or legal transaction. The term "entities," as used herein, refers to the plural of "entity."

"Field," as used herein, within the context of data, data elements or data structure, includes but is not limited to, a data unit, commonly as a unit of a data record. For example, a field may be a person's first name or a company name or even an ID, stored as a unit of a record of data. Depending upon the context, the use of the term could refer to the data structure or the value within the structure, although usually the term "field" refers to the data value itself. For example, when referring to copying fields, the context would suggest the copying of the values within the fields. However, when referring to a schema of fields within a record within a table within a database, the context would suggest that fields refers to the structural component. A field may also be considered as a column in a commonly-structured view of data having one record of data per row.

"Providing" and "Provide" as used herein, includes but is not limited to direct action to provide by a party as well as indirect action through another party, such as having another party provide the indicated good, hardware, software, data storage, database, entity, service, etc. Particularly in instances of indirect provision, the reader should understand that the terms "providing" and "provide" may have a meaning more synonymous with "utilize".

"Record," as used herein, within the context of data structure, includes but is not limited to, a group of one or more data fields. For example, a record may contain fields which, together, describe an entity, such as a customer.

The term "Software-as-a-Service" or "SaaS," as used herein, includes but is not limited to software commonly executed partially or fully on servers which distribute over a network some component of the software (e.g. output of code execution), with or without accompanying client-side code, to an interface of a client computer or device. SaaS licensing models commonly involve subscriptions, paid or unpaid, by the owner or operator of the client device, or by an organization which subscribes on behalf of a multitude of members of the organization.

The term "software," as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servlet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners. The term "software," as used herein, may also generally refer to the type of software which is Software-as-a-Service.

"Telephonic apparatus," or "telephone apparatus," or "telephonic framework" or "telephonic switching framework," as used herein, includes but is not limited to, a telephone switch, a computer, a computer telephony device, or combinations thereof. The words "telephone" and "telephonic" may be interpreted interchangeably herein when used as a modifier before the words "apparatus" or "framework." While, historically, telephonic switching was performed with industrial-grade hardware manufactured very specifically for the function of switching or bridging inbound and outbound calls, over analog or digital phone lines, newer technologies have allowed computers to have a role in the processes of telephonic switching, from or to public or private switched telephone networks. Some computers accept telephonic add-on cards to serve the role of telephonic switching but, particularly with much communication now utilizing SIP protocol, which can be employed by computers having ethernet ports, computers can also be deemed as telephonic devices without any add-on cards. A telephonic framework or telephone apparatus may, for example, involve a combination of a dedicated telephonic switching device and a computer, or in other instances, a combination of computing devices for network and data operations alongside a computer or telephonic switching device for telephony purposes. In fact, many telephonic frameworks or apparatuses today are computers running specialized software to execute telephonic functions. A telephonic framework or apparatus may also incorporate text-to-speech functionality entirely within the apparatus or help effect the outcome of spoken speech by utilizing internal abilities to play sounds within the apparatus alongside external conversion mechanisms to convert text to speech sounds. A telephonic framework or apparatus may be considered as a telephone switching framework for connecting inbound and outbound legs of telephone calls, or vice versa, the framework being either software or hardware, or a combination thereof. A telephonic framework or apparatus may have various forms.

"User," as used herein, includes but is not limited to, a person, computer, device, entity or software which interacts with or uses a software application, including use by proxy. A user may be an individual acting on behalf of an organizational entity, such as a person performing work for a company, or a user may be considered as the organizational entity itself, such as the company.

"User interface," as used herein includes but is not limited to the visual part of a software application through which a user interacts with the software application. A user interface may include an interface object or a series of objects displayed on a display unit. For example, a user interface may represent a group of elements such as a menu bar, a table or other data list, selection controls, and a submit button. A user interface may be display within a web browser or a user interface may be deemed to include the web browser itself.

Accordingly, FIG. 1 shows one illustrative example of a computer 101 that can be used to implement various embodiments of the invention. Computer 101 may, for example, be a server, such as an application server or a database server. Computer 101 may, for example, be a client computer with a display, configured to execute a web browser. Computer 101 may, for example, be a mobile device. Computer 101 may, for example, be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick), a scanner, a camera or a microphone. Output devices 123 may include, for example, a display unit 192, such as a monitor display, an integrated display, or a television; a printer; a stereo; or speakers.

Still further, computing unit 103 will be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. A network interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player or iOS or Android based smartphone. As known in the art, this type of digital music player can serve as both an output device for a computer (e.g. outputting music from a sound file or pictures from an image file) and a storage device.

In addition to a digital music player, computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smartphones, tablet computers, or portable music players, often operating the iOS, Symbian, Windows-based (including Windows Mobile, Windows Phone, or Windows RT), or Android operating systems.

Figure 2:
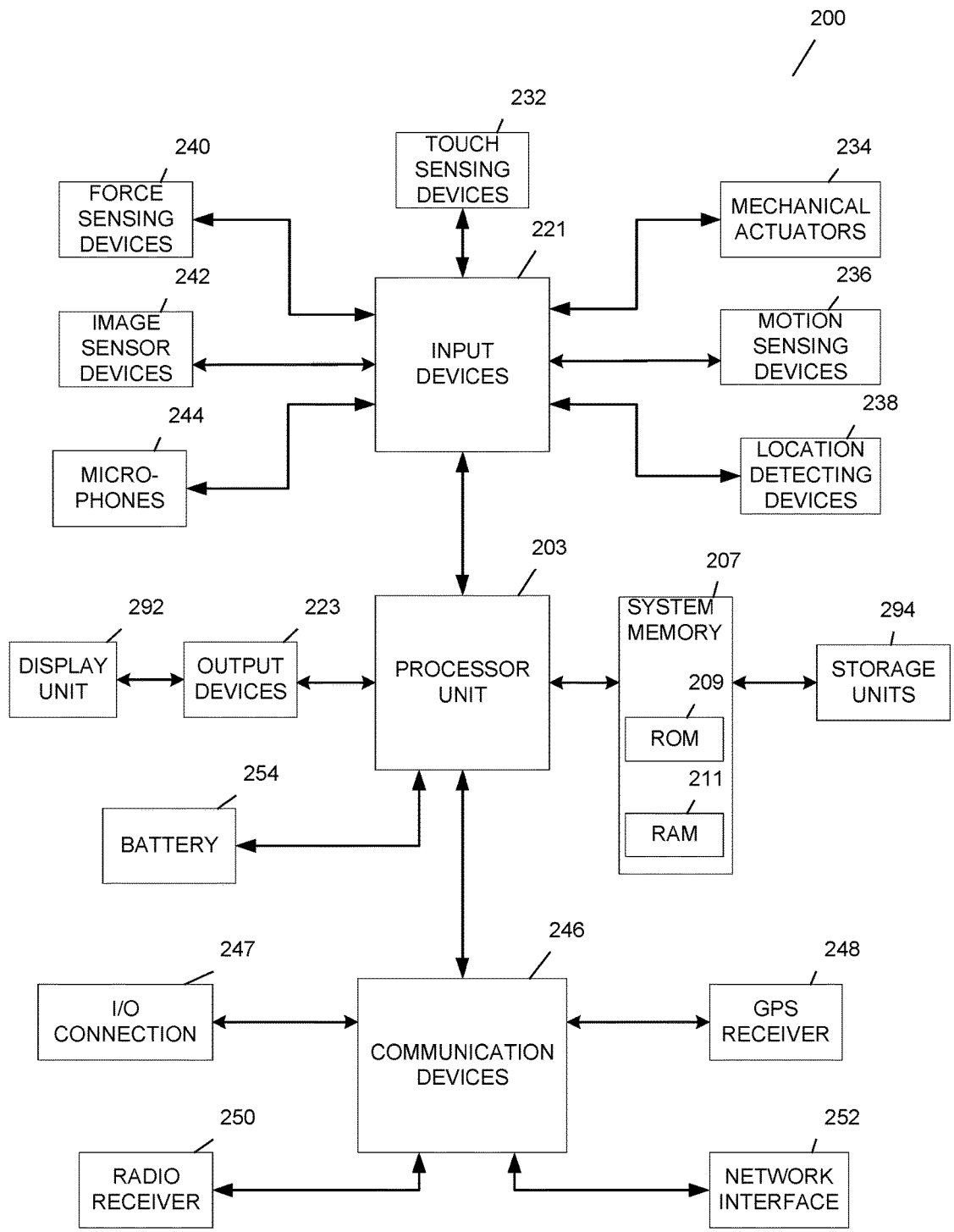
FIG. 2 shows a schematic view of an example of a mobile electronic device.

With reference to FIG. 2, an exemplary mobile device, mobile device 200, may include a processor unit 203 (e.g., CPU) configured to execute instructions and to carry out operations associated with the mobile device. For example, using instructions retrieved for example from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well known operating systems such iOS, Symbian, Linux, Windows, Mac, or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include touch sensing devices 232 such as touch screens, touch pads and touch sensing surfaces, mechanical actuators 234 such as button or wheels or hold switches, motion sensing devices 236 such as accelerometers, location detecting devices 238 such as global positioning satellite receivers, WiFi based location detection functionality, or cellular radio based location detection functionality, force sensing devices 240 such as force sensitive displays and housings, image sensor devices 242, and microphones 244. Input devices 221 may also include a clickable display actuator.

Mobile device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer and/or telephonic systems so that the computer readable code is stored and executed in a distributed fashion.

Figure 3:
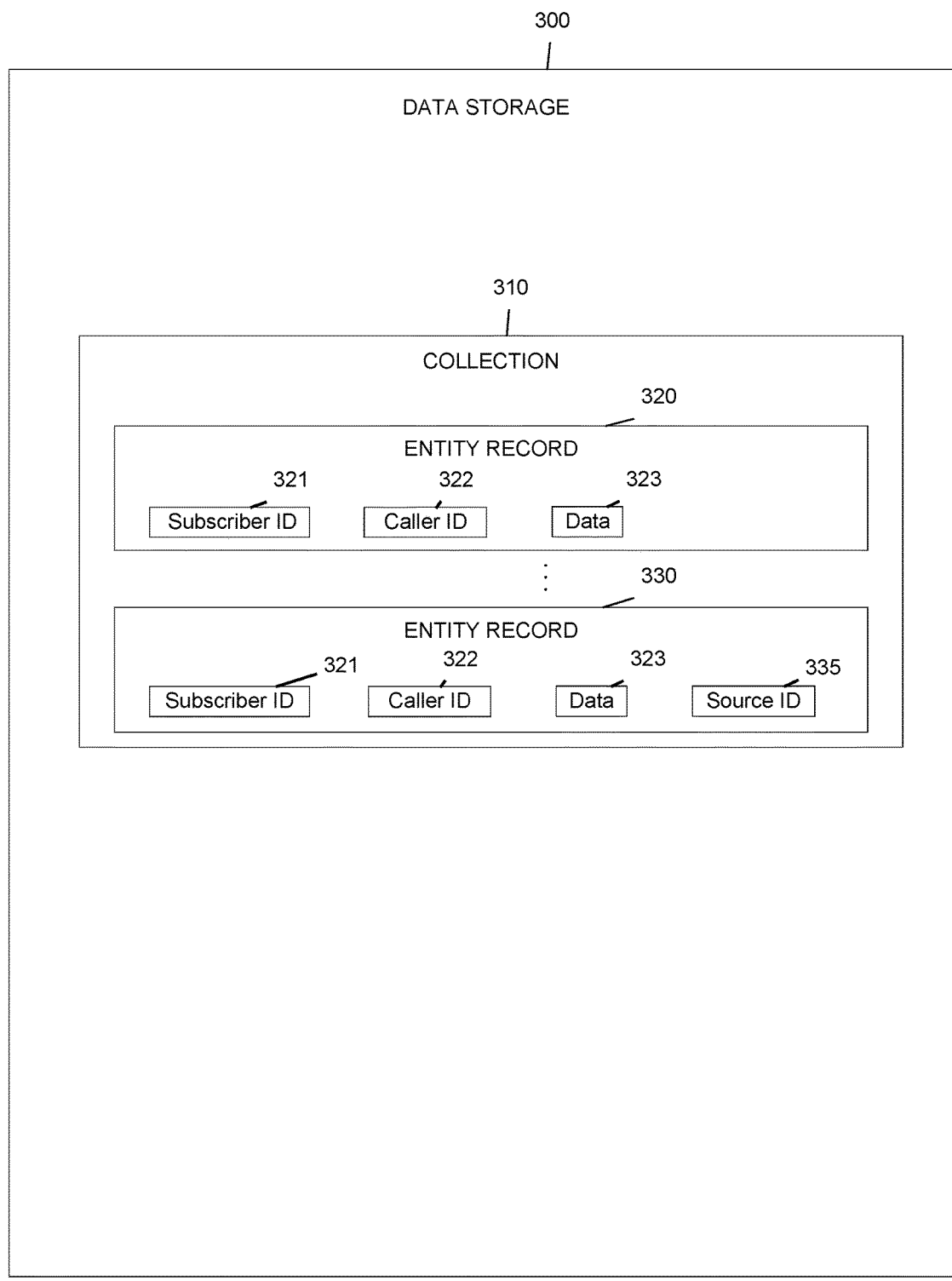
FIG. 3 shows a diagrammatic view of an example of a data storage, with the example containing a collection of entity data records.

FIG. 3 represents an example data storage. There are many possible types of data storages. The example data storage, data storage 300, includes a data collection 310.

Collection 310 illustrates a collection of entity records, such as example records 320 and 330. Each entity record 320 or 330 may contain a subscriber ID 321 as a unique identifier value corresponding to the subscriber of a SaaS application, or a member thereof, which owns or utilizes the entity data. When the data storage 300 includes or consists of a transactional database, a subscriber ID 321 is often, but not necessarily, referred to or kept as a primary key, but alternatively a primary key may exist alongside the data in the entity record. Each entity record 320 or 330 also provides one or more data fields, including caller ID digits 322, and one or more data field(s) 323 including, as examples, an entity name, an entity alternative name, an entity address, one or more other entity phone numbers, entity order/purchase history, and entity support history. The data in such entity records 320 or 330 may be stored within the data record or outside of the data record. For example, in the case of a transactional database, a normalize database pattern may store one piece of data in a parent record and other piece(s) of data stored in child record(s) mapped together by matching key or data field values. For the purposes of this illustration and disclosure, the organization of data fields within or associated with a data record is understood to be potentially varied and this illustration reflects just one possible organization method of the actual data layout. It is also possible in some variations that some portion of the depicted data is stored in one collection in one data storage while another portion may be stored in another collection in another data storage, even operated at different geographic locations. Finally, data may include a data field for a source ID 335, which may refer and map elsewhere in the data storage to the source user or member of an organization which originally input the entity record into the system, thus providing a level of granularity that may help identify both an organization as a subscriber (i.e. Subscriber ID 321) and its member (i.e. Source ID 335) who originally or last entered data into the entity record.

Source ID 335 could be a unique numeric ID, a unique alphanumeric ID, or any unique value possibly even being a user's name.

Architecturally, there are numerous possible variations of such data organization techniques. For example, Caller ID field 322 may be a reference or ID pointing to another record elsewhere containing the actual caller ID digits. A database architect could even have temporary tables to hold entity data before an entity provides permission to be added to a final collection. Again, there are alternate architecting methodologies which may be employed.

Referencing FIG. 3's sample architecture again, in other variations of a data storage architecture, the provider of the data storage and underlying data could be different than the provider of the application. Given the prevalence of today's low latency and wide-area networks, such variations are practical. For example, a database could be exposed in one data storage, and a Software-as-a-Service (SaaS) application could access the database across the internet or a local network.

In other variations, it is possible that more than one collection 310 would be made available to a software application. Some collections could be specific to a subscribing organization, but such is also not required because database filtering technologies easily allow an application to obtain the applicable records without collections being formed per each sub scribing organization.

Figure 4:
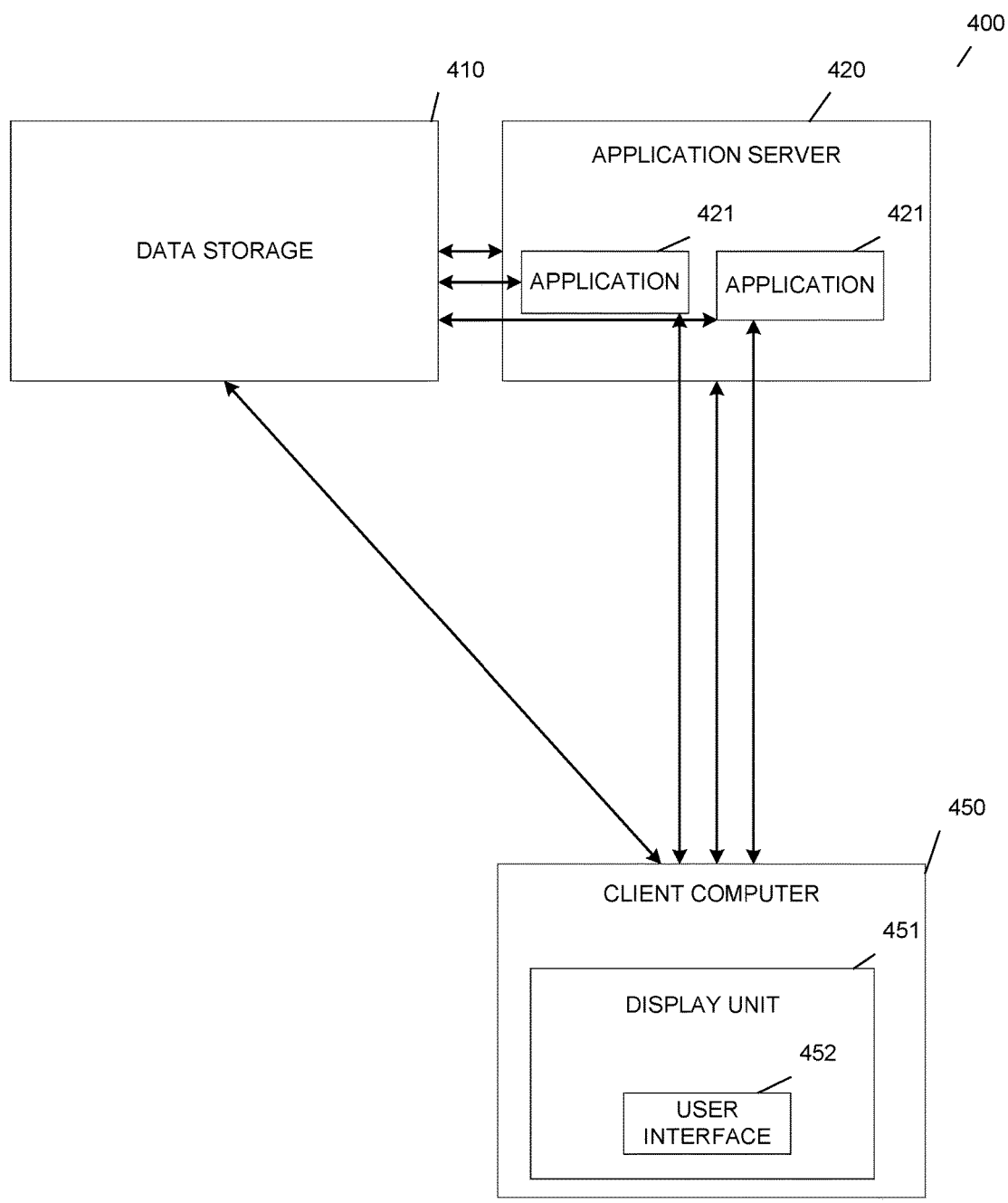
FIG. 4 shows a diagrammatic view of an example application server, an example application, an example data storage, and an example client computer.

In FIG. 4, we can see an example view 400 of a data storage 410, operating with an example application server, application server 420, and an example client computer, client computer 450. The data storage 410 could be representative of the data storage described in FIG. 3, but here represented from a broader perspective to show its relationship with other elements in an example architecture.

A data storage, such as the data storage 410, much like other elements of the invention, in some configurations, could represent a data storage operated by the implementor or, in other configurations, represent one operated by another party and simply utilized by the implementor. Furthermore, in instances where more than one data storage is utilized, it is possible for an implementor to directly provide a data storage containing a collection and also to indirectly provide and utilize another data storage containing a collection. For example, an implementor could directly provide the data storage and a database with a collection and/or indirectly utilize a data storage containing a collection across the internet.

The application server 420, and/or the client computer 450, are configured to access the data storage 410 via a network connection. The network connection could be a local area network connection, or a wide-area-network connection. A wide-area-network connection could include network connectivity over a private network serving more than one geographic location or it could represent the internet, or a combination thereof. Network connections could be wired or wireless. Network communications could occur in many theoretically different ways, with any of the now-known or later known network communications models, including, for example, using the TCP/IP or HTTP protocol over Ethernet network connections.

Data communication may be structured with, for example, Extensible Markup Language (XML). XML may be used as part of a Simple Object Access Protocol (SOAP). Representational State Transfer (REST) is another possible protocol that could be used. JSON formatting of data structures to transmit data could also be used. Unlike these generally open standards for communications, closed proprietary communication methods or protocols could also be used, such as those used by Microsoft SQL Server or Oracle database technologies. Many open or closed communications protocols or structures would be suitable and the architect of the solution must choose a method appropriate for the application.

Data communication with the data storage 410 may be encrypted. Data communication may involve client/server authentication to ensure access to the data is allowed by the application server 420 or the application(s) 421 or the client computer 450.

FIG. 4 further depicts an application server 420 and/or SaaS application(s) 421 and/or a client computer 450 communicating with the data storage 410. Software architecture models have grown increasingly complex and varied over time and it is feasible that data communication could occur with the data storage from a variety of software objects or locations. For example, a web server may function as an application server 420 and deliver an application 421 to a client computer 450 where the application 421 reads some data directly from the data storage 410, while other data is retrieved via the application 421, which is partially executing on the application server 420, which, in turn, communicates with the data storage 410, and returns data to the application 421 to pass back to the client computer 450. The number of applications and/or client computers could be different in various configurations.

In some variations, multiple applications are used. For example, one application 421 may communicate with a client computer 450 to perform functionality associated with a user adding an entity to a collection while a second and different application 421 may communicate with the same or different client computer 450 to perform functionality associated with a second user performing a task with one or more entities.

As FIG. 4 also shows, computer executable code associated with the application(s) 421 is transferred to a client computer 450.

In some examples, the computer executable code is partially, primarily, and/or wholly executed on the server side. The code may be written in languages such as C#, Java, JavaScript, PHP, or Ruby and implement server-side technologies like ASP.NET or CGI. In examples where the application server primarily executes the computer executable code, the computer executable code transferred to the client computer includes browser executable code.

The browser-executable code may include plain HTML and image files providing a cloud-accessible interface allowing users to operate the applications provided by the server-side applications. In particular, examples that are partially or primarily executed on the server side may be particularly suitable for cloud computing contexts. In some examples, the server side applications can access and manipulate local state data memory, such as by including cookies in the computer executable code transferred to the client computer.

In some examples, the computer executable code is configured to be executed partially, primarily, and or wholly on a user's computer or mobile device, such as client computer 450. The code may be written in a client-side executed markup language, such as HTML, a client-side-executed scripting language like Javascript, and/or a client-side executed compiled language like Java or C#. When transferred, the computer executable code on the client computer is configured to display a user interface 452 on a display unit 451 connected to, or part of, the client computer 450.

The client computer 450 could be a desktop computer with monitor, such as one running a Windows or Mac or Linux operating system. Or, for example, the client computer 450 could be a mobile device with an integrated display unit, such as an Apple or Android phone or tablet, where such mobile devices are configured to allow execution of software application(s) 421.

The application server 420 may also be considered, in some variations, as a combined hardware and software vehicle that allows downloads of software application(s) 421 to client computers. Examples of such include online app stores from Apple, Google, and Microsoft. In such examples, users download one or more application(s) 421 and the application server 420 is not likely involved in the application execution thereafter download. The application(s) 421 would likely execute wholly on the client computer 450 and the client computer 450 would communicate directly with the data storage 410.

Figure 5:
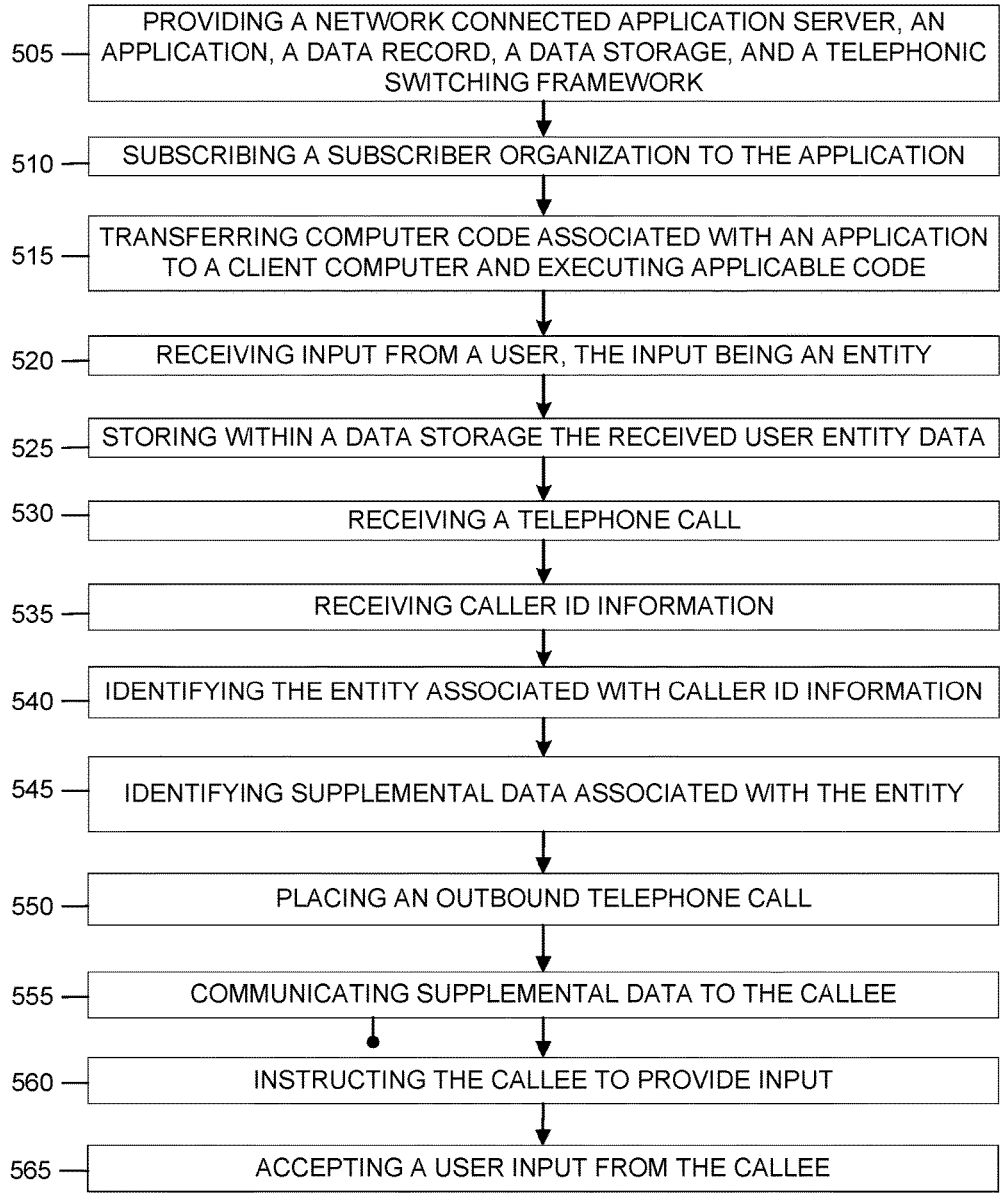
FIG. 5 is a flow diagram of an example of a method for communicating supplemental data to a callee via data association with a Software-As-A-Service (SaaS) application.

With reference to FIG. 5, an example of a method for communicating supplemental data to a callee via data association with a Software-As-A-Service (SaaS) application, method 500, will now be described.

As FIG. 5 shows, method 500 includes, at step 505, providing a network-connected application server, the application server to access a data storage, an application, and a telephonic switching framework. These elements were described in the explanation for FIG. 4 and/or in reference definitions herein.

Method 500 then, at step 510, includes subscribing a subscriber organization to a SaaS application. The application may, for example, represent a CRM (customer relationship management) application, help desk application, sales management application, invoicing application, accounting application, messaging application, or other such applications often deployed in business environments. The subscribing a subscriber organization may, in some instances, consist of an application publisher entering into a business relationship with an organization whereby designated users of that organization could utilize a SaaS application. Such a subscription could be provided with or without a fee. Various SaaS "freemium" models allow subscribers to use limited version of SaaS applications without a charge, in hopes of the subscriber later upgrading to a paid version of the application.

Step 515 includes transferring the computer code associated with an application to a client computer. The computer code may, for example, represent compiled code and/or non-compiled scripted code and/or browser-executable code, such as HTML and Javascript, configured to produce a display within a web browser on the client computer. The code may or may not work in coordination with code also executing on the application server. To the extent that code needs to be executed by the processor of the client computer rather than simply generating a user interface display, such is performed at this step.

At step 520, the user instructs the application, via the user interface, that they wish to add, or edit, one or more entity records within the data storage. An example of this process may include a user who inputs data fields forming a record, portraying a customer of the subscriber organization, and the customer entity being stored in a database.

At step 525, the user input is stored within a data storage. The user input may, for example, consist of one entity record portraying a customer, which is then inserted into a computer database. As mentioned elsewhere herein, the process of inserting to the data storage could occur in numerous ways, including but not limited to, data passing directly from the application to the data storage, data passing through the application server to the data storage, data passing over the internet, data passing across a local area network, or other such methods of passing and storing data.

At some point after step 525, an incoming call 530 may be received at a telephonic switching framework connected to a public or private switched telephone network (STN). The telephonic framework could, for example, be a switching apparatus or telephone switch. The call may, for example, be an internal-to-the-current-network call, a local call, a national call, or an international call, coming in via analog or digital technologies, the latter including possibly using SIP.

Continuing with method 500, in FIG. 5, step 535 illustrates that caller ID information is received from the originating device or telephone company on the STN. Caller ID information may, for example, be received as automatic number identification (ANI) or any other form that reflects the originating caller's phone number or address. In the cases of some digital devices, such as SIP-based devices, a caller ID number may be an address consisting of alphanumeric characters.

At step 540, the entity associated with the caller ID information is identified within the data storage. The data storage may be located anywhere accessible through computing and network technologies, and even perhaps in the telephonic framework itself. Suppose, for example, the caller ID digits were "2125551234." A search request from a telephonic framework to the data storage may, for example, consist of a call to a database to retrieve records based upon the search criteria of "2125551234" within database fields which contain telephone numbers of entities. A search may commonly be made with Structured Query Language (SQL) to retrieve the desired records from a database such as Microsoft SQL Server or Oracle, but other methods of data retrieval may be employed. The search result may, for example, return an entity record corresponding to "John Smith," whose "2125551234" telephone number had been input by a user of a subscriber organization at step 525.

When an entity is identified at step 540, supplemental data may be further identified as associated with the entity at step 545. Supplemental data may be returned, for example, to the telephonic framework by the data storage or a data storage processor (e.g. a database server) at the same time as the entity name is returned to the telephonic switching framework. For example, when searching for caller ID number "2125551234" and finding the matching entity "John Smith," a database server may also return the entity's name, address, previous sales history, previous support ticket history, and other details. While the supplemental data could be provided to the telephonic switching framework in a separate step from the identification of the entity itself, the data may be provided at the same time as the entity.

At step 550, the telephonic switching framework attempts to connect the inbound caller or inbound device to another person or device by placing an outbound telephone call to a destination phone number or address. The destination phone number or address may, for example, be that of a person working for an organization subscribing to a SaaS application, or an individual associated with the organization, having been provided access thereto. The outbound call, for example, may be placed via telephone lines back through a telecommunications network such as a PSTN, or through a communications network such as via webRTC or SIP to a web browser, digital phone, softphone, or computing device.

While it is commonly perceived that a call is a simple communication channel between two people or devices, those within the telecommunications industry understand that a connected call may be comprised of one call to a telephonic switching framework or apparatus (i.e. telephonic switch), along with another call from the telephonic switching framework or apparatus to the end destination phone number or address, with the telephonic apparatus bridging the two calls together to form the perceived single call. In such instances, those within the industry understand that there are two legs to the perceived single call, the first leg being the inbound call to the telephonic switching framework or apparatus, and the second leg being the outbound call from the telephonic switching framework or apparatus to the end destination. At step 550, the second leg of the perceived single call is initiated by way of an outbound call attempt although a fully-connected call between the inbound leg and the outbound leg is not yet established.

At step 555, supplemental data is communicated to the callee, the callee being a person or device at the destination phone number or address. For example, in some variations, a callee may have answered the outbound telephone call at step 550 from the telephonic switching framework and at step 555, the telephonic switching framework may communicate supplemental data obtained from the data storage including an entity name or geographic location, thus informing the callee or even the callee's device (e.g. voicemail on a mobile phone) of the supplemental information associated with the entity as obtained from the data storage.

In some instances, it is not necessary for a callee to answer the call in order to received supplemental data. Supplemental data may be transmitted by one or more available methods to the callee's device before or after the outbound call leg is answered by the callee.

Supplemental entity information communicated at step 555, as per the aforementioned example, includes, but is not limited to, data input at step 520 by any user of the subscriber organization to the SaaS application. The user who input the entity data at step 520 may potentially, in one variation, also be the person receiving the call at step 550.

The communication of supplemental entity data could, in some examples, be transmitted digitally, including but not limited to a web browser with web real-time communication (webRTC) capability, or to a telephone device. Digital messages may, for example, appear as a message in a layer in a web browser with text "call from customer with a history of 7 orders" or on an LCD display sent in a SIP header intended for a caller name to appear on a SIP telephone as "7 orders".

The communicating of supplemental entity data at step 555 may, in another variation, be optionally performed by employing text-to-speech technology. For example, if supplemental entity data included that the entity was associated with support ticket "6580," the telephonic switching framework may play an audible message "related to support ticket six-five-eight-zero" to the callee or callee device. The audible message could be entirely digitally constructed by the telephonic switching framework or the message could be manufactured as a sound file (e.g. MP3) outside of the telephonic switching framework (e.g. with a Microsoft Azure or Amazon AWS text-to-speech service), or a combination thereof. Some messages may reflect partial human voice records (e.g. "related to support ticket") used in conjunction with digitized voice components (e.g. "six-five-eight-zero"). Arguably, all pieces of a message could be constructed with fragments of actual human voice if digitized robotic sounds were not utilized. Many variations of in-framework or off-framework methodologies could be employed to manufacture the resultant audible message communicated as text-to-speech, but the concept of effecting text-to-speech is still understood to be performed partially or wholly at the telephonic framework since such would be involved in the communication of the audio channel of the outbound telephone call.

In another variation, the communicating of supplemental data at step 555 may further include embedding supplemental data into a voicemail or email or text message delivered to the callee.

Following the communication of supplemental data at step 555, it is possible that the callee was not available or the callee intentionally chose to ignore the outbound call from the telephonic device, particularly, perhaps, based upon the communicated supplemental data. Accordingly, the method depicts a possible end to the procedural flow at step 555, but alternatively the flow could continue if the callee or callee device were still available to the telephonic switching framework.

At step 560 of method 500, the telephonic switching framework optionally requests callee input. For example, a message "press 1 to accept the call or press 2 to reject" could be audibly played to the callee. In another example, text "press 'a' to accept" could be displayed in a web browser webRTC device utilized by the callee. In another example, text "speak 'yes' to accept" could be displayed on a software application screen which utilizes speech-to-text technology and a microphone to detect the callee's voice as an input. In another example, spoken instruction "speak 'yes' to accept" could be played to a callee on a mobile phone device, using speech to recognition and the device's microphone to determine the callee's response.

At step 565, the telephone switching framework optionally accepts callee input, the input being, for example, a DTMF digit or keystrokes on a computing device, or words spoken to a speech recognition engine. The callee input in many variations, would instruct the telephonic switching framework to connect the inbound leg of the call to the outbound leg. Connecting the two call legs together would likely involve connecting the audio transmit channel of one leg to the receive audio channel of the other leg such that two parties could speak to each other from their respective devices.

The order of steps in FIG. 5 is consistent with typical configurations, but in other configurations, the order of steps may be altered. For example, step 535 could be performed at the same time as step 530, depending upon the protocol of a switched telephone network. In another example, step 540 could be performed together with step 545.

FIG. 6 illustrates an example application user interface, user interface 600, wherein the user interface is configured to allow a user to add or edit an entity within a collection of one or more entities in a data storage. User interface 600 represents a web page pointed to a website address 605. This example involves an application hosted on an application server at website address 605, working in conjunction with a web browser displaying this user interface 600. Other examples of a user interface include desktop applications, tablet applications, mobile phone applications, or even smart watch applications, all of which may not display a website address 605.

Example user interface 600 includes an example application name, application name 610. This application name, "CRM Application" reflects a customer relationship manager application. This example application is a hosted Software-as-a-Service (SaaS) application.

Example user interface 600 includes a navigation bar 615. Although not required, applications commonly have a navigation element, which in this case illustrates two options, customers and prospects, and the customers option has been selected, as indicated by the symbolic line underneath the word "Customers". We will further assume for purposes of this example that the user chose a sub-option "Add A Customer" from a flyout option on navigation bar 615. This selected page is designed to assist a user with the operation of adding a customer to a collection of customers.

This example user interface 600 also includes many input controls, such as input textboxes 620, 621, 622, 623, 624, 625, 630, 631, 632 and 640. Such input controls may, in some variations, not be textboxes. For example, textbox 625 could be replaced with an input dropdown control containing a populated list of states.

Example user interface 600 also includes some static text elements 641, 642, and 643, each of which is intended to portray possible values obtained from the data storage. In this example, after the user has typed an email address into the form, via the use of Asynchronous JavaScript And XML (AJAX), previous partial entity data from the database could be retrieved based solely upon the email address and such data is displayed as elements 641, 642, and 643. This example depicts a mixed data entry and data retrieval scenario, but such is not necessary. In other common variations, only data entry may occur on a user input form. Common variations would likely employ data entry, data editing, and data viewing as separate views, despite the mixed-case variation depicted in user interface 600 for example purposes only.

Example user interface further contains a submit button 690. Although a submit button 625 is not required, such as if AJAX were to be used to save data after each element is entered, a submit button is a commonly-used element with input textboxes. Here, a user could type entity information to add an entity and click the "SUBMIT" button 690 to reflect their desire for the application to save the data into the data storage. If the user interface were rendered with HTML, for example, the user input controls could be rendered within a form tag and submitted with the GET or POST methods. Other methodologies exist and could be employed. In some examples, validation of acceptable user input or specific required fields may be employed to ensure data integrity or consistency in the data storage. Where the user has not completed the form in accordance with optional validation rules, the user would be instructed to fix the various input control data and submit the form again using button 690.

Figure 7:
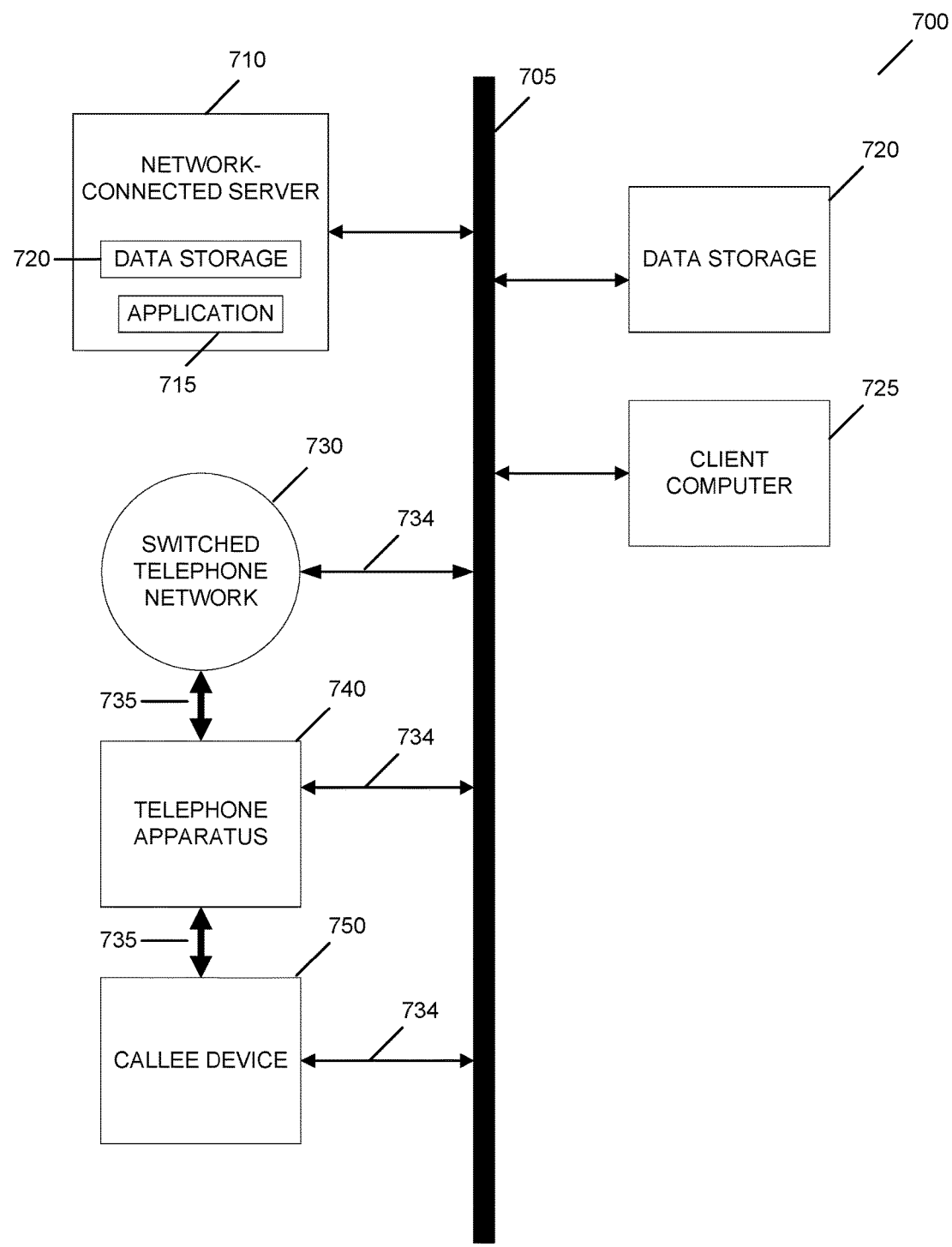
FIG. 7 is a diagrammatic view of a server, a data storage, a switched telephone network, a telephone apparatus, and a callee device.

In FIG. 7, we can see an example view 700 of a network 705, a network-connected server 710, an application 715, a data storage 720, a client computer 725, a switched telephone network 730, a telephone apparatus 740, and a callee device 750. This example view could depict a system used to communicate supplemental data to a callee via data association with a Software-as-a-Service (SaaS) application.

Example network 705 may reflect a wide-area network (WAN) or local-area network (LAN), or both, or any other network designed to facilitate communication between servers, computers, data storages, telephone networks, telephone switches, and other telephone hardware, including where such devices may be at different geographic locations. Network protocols employed may be varied and may include security and encryption mechanisms to securely transmit data. Protocols may, for example, include Transmission Control Protocol/Internet Protocol (TCP/IP) and Session Initiation Protocol (SIP).

Example network-connected server 710 and example application(s) 715 are as previously described in the description for FIG. 4.

Example data storage 720 is as previously described in the description for FIG. 4. Note, however, in this diagram that data storage 720 is depicted to exist either as a component of the network-connected server 710 or as a separate data storage, or as a combination thereof. As previously described, there are many possible data storage architectures which may be utilized.

Example client computer 725 is as previously described in the description for FIG. 4. Not specifically depicted in this diagram are optional display unit and user interface elements which are presumed for the purposes of this example diagram to exist consistently with the description for FIG. 4.

Example switched telephone network (STN) 730 may represent a public or private switched telephone network. In one possible variation, a public switched telephone network (PSTN) such as that of a local, national or international telephone company may receive a call from an originating subscriber or another telephone company. In the course of receiving a call, the equipment on the STN may receive caller ID information.

Example communications pathway 734 depicts communication from a telephone network or device occurring over the network 705, as compared to example telecommunication pathway 735 which depicts communication from a telephone network or device occurring over one or more analog or digital telephone lines. Analog telephone lines may include plain-old-telephone-service (POTS) lines. Digital telephone lines may include Integrated Services Digital Network (ISDN) lines, T1 lines, T3 (also known as Digital Signal 3/DS3) lines. It is further possible that a combination of communications pathway 734 and telecommunications pathway 735 may be used in the overall transmission of a telephone call and related data.

Example telephone apparatus 740 (aka "telephonic apparatus" or "telephonic switching apparatus") reflects a telephone switch, the switch being a computer telephony apparatus designed to, among other things, accept inbound calls, place outbound calls, and bridge the audio of inbound and outbound legs together to form an effective new single call, if so desired. The example telephonic switching hardware in this example is consistent with the definition of a telephone apparatus previously described, but as noted in such definition, there are many possible forms for the telephone apparatus, constituting a framework for managing inbound and outbound legs of calls.

Telephone apparatus 740 may also be configured to associate caller ID information with a data record in the data storage 720. By doing so, supplemental data can be identified. It should be understood that the disclosure herein of the telephone apparatus being configured to associate caller ID information with a data record may, in some implementations, involve the telephone apparatus communicating with the network-connected server 710, a database server, or yet another computing device to perform the fundamental task of associating the caller ID information with the data record, but it shall be understood that the delegation of that task shall still constitute at least the telephone apparatus 740 performing such association. For example, if the telephone apparatus 740 communicates caller ID information to a computing device, and such device performed the association of the caller ID information with supplemental entity data, and such device further prepared audio messages to be communicated to a callee, it should still be deemed in the description herein as the telephone apparatus performing an association, even if by way of delegation or implied delegation. "Implied delegation" shall be deemed as allowance by the telephone apparatus 740 of a computer or another device to perform the association for the benefit of the telephone apparatus 740 such that the data resultant from the association can be communicated by the telephone apparatus to a callee device 750.

Example telephone apparatus 740 is further configured in this depiction to play pre-recorded audio files, to effect text-to-speech voice synthesis, to accept the input of either human speech or DTMF digits from a telephone, and to communicate with analog and digital telephonic or computing devices. In some variations, telephone apparatus 740 could be a computer or computing device which also serves as the network-connected server 710, providing functionality of both telephonic and application-serving features.

Example callee device 750 is a telephone or computing device or computing software application intended to effect telephonic-style communication. Such devices may, as examples, be analog telephones, digital telephones, SIP-based digital telephones, computer softphones, or computer software applications. Computer software applications further include, as examples, messaging applications, team chat applications, softphone applications, call center agent applications, help desk applets, sales team applets, and voice/video communications software.

In the example view of FIG. 7, the inbound leg of a telephone call could, for example, originate from the switched telephone network 730 across a SIP-protocol network connection across communications pathway 734 to the telephone apparatus 740, whereby an outbound call leg could be initiated by the telephone apparatus via a call across telecommunications pathway 735 to a mobile telephone callee device 750.

As previously described, the callee at callee device 750, or the callee device 750 itself, may be provided with supplemental data about the caller, such communication potentially including text-to-speech voice synthesis. In a possible variation, the callee at callee device 750 may respond to communication from the telephone apparatus 740 with, as an example, a DTMF digit input to convey their willingness to accept the bridging of the inbound and outbound call legs. An example system as depicted in FIG. 7 could be configured as shown to effect the bridging of inbound and outbound call legs such that the audio pathways of the inbound caller could be connected to the audio pathways of a callee or callee 750. Similarly, if a callee rejects the acceptance of the call bridging connection, the telephone apparatus 740 could be configured to not bridge the inbound and outbound leg together and instead play a pre-recorded or text-to-speech message to the inbound caller reflecting that a call connection to the outbound leg will not be completed.

In another variation, the telephone apparatus 740 could be further configured to retry another callee at an alternative callee device 750 if the callee at callee device 750 were not available.

In yet another variation, the telephone apparatus 740 could be configured to attempt outbound calls to multiple callee devices, such as callee device 750, simultaneously, or in a sequential order, with the goal of communicating supplemental data information about the inbound caller to at least one of the available callees at callee devices such as callee device 750. In such a configuration, for example, the first available callee wishing to be connected to the inbound caller could signify their desire with input to the telephone apparatus 740, upon which the telephone apparatus 740 could disconnect any still-in-progress alternative outbound call legs and connect the first accepting callee at their callee device 750 to the inbound caller. Many further variations of a system designed to connect inbound and outbound call legs, based upon supplementally-provided information about a caller, are possible.

The various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements unless otherwise indicated.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A method for communicating telephonic entity data to a callee, comprising:
   providing a network-connected application server, the application server to access a data storage;
   providing a software-as-a-service (SaaS) application from the networked application server, the application to display a user interface;
   subscribing a subscriber organization to the SaaS application, the subscriber organization having a subscribing member;
   receiving at the user interface of the SaaS application a user input corresponding to an entity, the entity being a person or a company;
   storing within the data storage a data record, the data record comprising the user input;
   providing a telephonic switching framework, the framework to connect with a switched telephone network (STN);
   receiving an incoming telephone call, the call originating from the entity;
   receiving caller ID information from the STN, the caller ID information comprising a received data element;
   identifying the entity from the caller ID information;
   identifying within the data storage supplemental data, the supplemental data comprising a stored data element associated with the entity which is different from the received data element within the caller ID information;
   placing an outbound call from the telephonic switching framework to a subscribing member of the subscriber organization; and
   communicating to the subscribing member the stored data element of the supplemental data.

2. The method of claim 1, wherein the communicating to the subscribing member is performed via text-to-speech voice synthesis.

3. The method of claim 1 wherein the communicating to the subscribing member comprises at least one of the following: communication of data to a caller ID screen of a telephonic device; communication via the interface of the SaaS application; communication via email; communication via a short message service (SMS) text message; communication via a multimedia messaging service (MMS) message; communication across a Session Initiation Protocol (SIP) pathway to a SIP telephone; communication across a SIP pathway to a SIP softphone; communication across a webRTC pathway to a software application; communication of data to a software application; or combinations thereof.

4. The method of claim 1, wherein the subscriber organization has a plurality of subscribing members.

5. The method of claim 1, further comprising subscribing a plurality of subscriber organizations to the SaaS application, the subscriber organizations each having at least one subscribing member.

6. The method of claim 1, wherein the communicating to the subscribing member includes instructing the subscribing member to make a choice to accept or reject the incoming call.

7. The method of claim 1, wherein the communicating to the subscribing member comprises providing caller name information.

8. The method of claim 1, wherein the stored data element of the supplemental data comprises at least one of the following: caller geographic information; sales or order information associated with the caller; support ticket information associated with the caller; billing history information associated with the caller; or combinations thereof.

9. The method of claim 1, further comprising:
   playing a prompt to the subscribing member, the prompt requesting an input be made to connect the call;
   accepting a user response from the subscriber member.

10. The method of claim 9, wherein the user response comprises at least one of the following: a DTMF digit on a telephone; a spoken word or phrase; a click on a computing device, a keystroke on a computing device; a gesture on a computing device; a touch on a touchscreen of a computing device; and combinations thereof.

11. The method of claim, 1, wherein the SaaS application comprises at least one of the following application types: a help desk application; a customer-relationship-manager (CRM) application; an accounting application; an invoicing application, an organization team communication application; and combinations thereof.

12. The method of claim, 10, wherein the SaaS application comprises at least one of the following application types: a help desk application; a customer-relationship-manager (CRM) application; an accounting application; an invoicing application, an organization team communication application; and combinations thereof.

13. A system for audibly communicating supplemental telephonic entity data to a callee via data association with a software-as-a-service application, comprising:
   a server to:
   at least partially execute computer code with a processor;
   transfer a software-as-a-service (SaaS) application to a client computer, the SaaS application to accept a user input and store the user input into a data record on a data storage, the user input comprising supplemental caller ID data related to an entity, the entity being a person or a company; and
   a telephonic apparatus, the apparatus being configured to:
   receive an incoming call from the entity;
   receive from a switched telephone network (STN) caller ID information;
   associate the caller ID information with the data record;
   place an outgoing call to a callee device of a member of an organization subscribing to the SaaS application;
   effect text-to-speech voice synthesis; and
   audibly transmit with text-to-speech voice synthesis to the callee device the supplemental caller ID data from the data record, the supplemental caller ID data comprising at least one stored data element associated with the entity which is different from the caller ID information.

14. The system of claim 13, wherein the telephonic apparatus comprises at least one of the following: one or more telephonic switching devices; one or more computing devices; or combinations thereof.

15. The system of claim 14 wherein the callee device comprises at least one of the following a telephone; softphone; a computer; or combinations thereof.

16. At least one non-transitory computer-readable medium storing computer-readable instructions that, when executed by one or more computing devices, cause at least one of the one or more computing devices to execute according to claim 1.

17. The at least one non-transitory computer-readable medium of claim 16, wherein the execution of at least one of the one or more computing devices further comprises communicating to the subscribing member via text-to-speech voice synthesis.

18. The at least one non-transitory computer-readable medium of claim 16, wherein the execution of at least one of the one or more computing devices further comprises communicating to the subscribing member via at least one of the following: communication of data to a caller ID screen of a telephonic device; communication via the interface of the SaaS application; communication via email; communication via a short message service (SMS) text message; communication via a multimedia messaging service (MMS) message; communication across a Session Initiation Protocol (SIP) pathway to a SIP telephone; communication across a SIP pathway to a SIP softphone; communication across a webRTC pathway to a software application; communication of data to a software application; or combinations thereof.

19. The at least one non-transitory computer-readable medium of claim 17, wherein the execution of at least one of the one or more computing devices further comprises receiving input from the subscribing member.

20. The at least one non-transitory computer-readable medium of claim 18, wherein the execution of at least one of the one or more computing devices further comprises receiving input from the subscribing member.

* * * * *